United States Patent
Selvanandan et al.

(10) Patent No.: US 11,734,237 B2
(45) Date of Patent: Aug. 22, 2023

(54) MANAGEMENT OF APPLICATION OF DATA ACTIONS TO UPDATED DATA OBJECTS IN A DATA STORE

(71) Applicant: salesforce.com, inc., San Francisco, CA (US)

(72) Inventors: Piranavan Selvanandan, San Francisco, CA (US); Mehmet Orun, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/067,429

(22) Filed: Oct. 9, 2020

(65) Prior Publication Data

US 2022/0114151 A1   Apr. 14, 2022

(51) Int. Cl.
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
CPC .. G06F 16/2365; G06F 16/215; G06F 16/214; G06F 16/219; G06F 16/217
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,079 A * | 7/2000 | Gerard .................. G06F 9/4488 |
| 6,092,083 A | 7/2000 | Brodersen et al. |
| 6,112,186 A * | 8/2000 | Bergh .................... G06Q 30/02 |
| | | 705/7.32 |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

*Primary Examiner* — Taelor Kim

(74) *Attorney, Agent, or Firm* — Lowenstein Sandler LLP

(57) ABSTRACT

Systems and methods are described for managing the application of data management actions to one or more data objects in a data store. The systems and methods extract at least a portion of a first set of data objects from a data store to a file, wherein a first data object of the first set of data objects comprises a first set of attributes and a set of data management actions. A second set of data objects is loaded into the data store. A confidence score is generated based on a comparison of the first data object of the first set of data objects and a second data object of the second set of data objects. A determination is made that the confidence score satisfies a condition. In response to the confidence score satisfying the condition, the set of data management actions is applied to the second data object.

17 Claims, 6 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,564,215 B1 * | 5/2003 | Hsiao ................. G06F 11/1469 |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2019/0363945 A1* | 11/2019 | Rogynskyy ...... G06Q 10/06312 |
| 2020/0320130 A1* | 10/2020 | Korpman ............. G06F 16/244 |

* cited by examiner

FIGURE 4

Time = T1

State: Data Store after Data Load #1
{GPID:"123", Individual: { First:"John", Last:"Smith"}, Lineage: [ "Lead-001" , "Contact-001"]}
{GPID:"456", Individual: { First:"Peter", Last:"Orun"}, Lineage: [ "Lead-002", "Contact-002", "Order-002"]}

Time = T2

State: Data Action Table
{GPID:"123", Action: "Rename", Last: "Doe"}
{GPID:"456", Action: "Rename", First: "Mehmet"}
{GPID:"456", Action: "DeleteRecord", Record: "Contact-002"}

Time = T3

Extraction File contents:
{ID: 1, GPID:"123", Action: "Rename", Last: "Doe", Lineage: [ "Lead-001", "Contact-001"]}
{ID: 2, GPID:"456", Action: "Rename", First: "Mehmet", Lineage: [ "Lead-002", "Contact-002", "Order-002"]}
{ID: 3, GPID:"456", Action: "DeleteRecord", Record: "Contact-002", Lineage: [ "Lead-002", "Contact-002", "Order-002"]}

Time = T4

State: Data Store after Data Load #2
{GPID:"999", Individual: { First:"John", Last:"Smith"}, Lineage: [ "Lead-001" , "Contact-001"]}
{GPID:"888", Individual: { First:"Peter", Last:"Orun"}, Lineage: [ "Contact-002" , "Order-002"]}
{GPID:"777", Individual: { First:"Peter", Last:"Orun"}, Lineage: [ "Lead-002"]}

Time = T5

History file action ID #1's lineage matches GPID 999's lineage and applies the original action that was previously applied to GPID 123.
History file action ID #2's lineage partially matches GPID 888's lineage AND GPID 777's lineage but matches completely the union and can be applied to both profiles even though the original action was on one only: GPID 456.

MANAGEMENT OF APPLICATION OF DATA ACTIONS TO UPDATED DATA OBJECTS IN A DATA STORE

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate to data recovery solutions, and, more specifically, to the management of a migration of workflow data.

BACKGROUND

Data stores (e.g., one or more databases) may be employed to store large volumes of data objects. The data objects and corresponding data may be managed by a data steward tasked with performing one or more data management actions associated with the data objects. A data steward implements changes to the one or more data objects (e.g., user profiles or global user profiles) by executing the data management actions (e.g., data changes, data object deletions, data object creation, etc.) on an ongoing basis. For example, these changes, or data management actions, include providing a new preferred last name, deleting contact points linked to a user profile or requesting a "Do Not Process" flag be added to a user profile. The data management actions are executed on data objects having a unique identifier that is non-deterministically generated.

In certain instances, the data store storing the multiple data objects and associated information is deleted (e.g., as a results of a data flush operation) and new data objects are re-ingested. However, the identifiers associated with the new data objects may be different from the identifiers associated with the deleted data objects. Accordingly, all previously executed data management actions associated with the initial set of data objects are no longer applicable to the same logical profile. As such, the reapplication of previously executed data management actions must be performed manually by a human operator. This highly time-intensive and operator-intensive manual process requires the human operator to utilize a portion of the information stored in a flushed data object (e.g., an e-mail address) to perform look-up operations to manually "find" the equivalent data object with its new data object identifier. Upon identifying a corresponding data object in the new set of data objects, the human operator must then request re-application of the data management action to the associated data object.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

FIG. 4 illustrates example data objects managed by a data action management system during an example time period according to one or more implementations.

DETAILED DESCRIPTION

Figure 1:
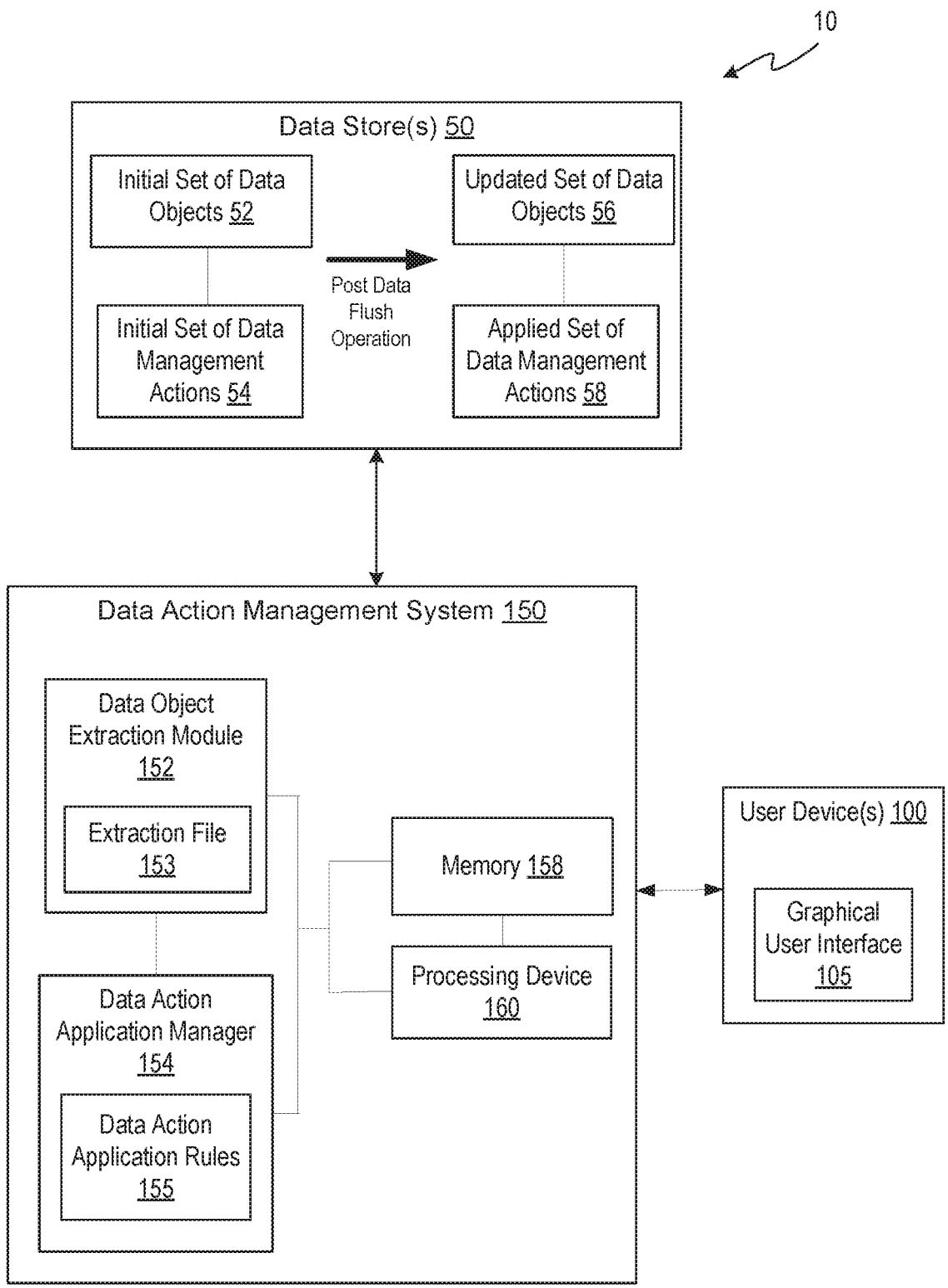
FIG. 1 shows a block diagram of an example environment in which a data action management system can be used according to one or more implementations.

The implementations described herein relate to managing the application of one or more previously applied data management actions to a set of data objects (e.g., user profiles) maintained in a data store. The system (also referred to as a "data action management system") maintains a set of rules (also referred to as "data action application rules") that are configured to automatically apply a historical data action to an updated data profile in response to satisfaction of a condition.

According to embodiments, an initial or first set of data objects (e.g., unique user profiles) are maintained in a data store (e.g., one or more databases including one or more data structures including the data objects). A set of data management actions (e.g., data stewardship actions including a change, edit, update, addition, or deletion action that have been applied to one or more of the data objects) are further maintained in the data store. The set of data objects and corresponding set of applied data management actions are collectively referred to as a "data management history".

In response to an operation associated with the data store that results in the deletion of the initial set of data objects (e.g., a data flush operation), prior to the deletion, at least a portion of the data management history is exported into a file (also referred to as an "extraction file"). In an embodiment, prior to the deletion of the data store and stored data objects, a set of previously executed data management actions and one or more attributes associated with a data object are extracted by the data action management system and maintained in the extraction file.

In an embodiment, following the deletion of the initial set of data objects and the extraction operation, an updated set of data objects is added or loaded into a data store (e.g., a new data store or the original data store that was flushed). In an embodiment, the updated set of data objects can have a different schema or format (e.g., an array of data that is different from the initial or first set of data objects) and be identified by a different data object identifier.

In an embodiment, the data action management system compares at least a portion of the respective data objects of the updated set of data objects to information maintained in the extraction file in accordance with the data action application rules. In an embodiment, each data object includes a set of attributes including a set of profile data and one or more attributes associated with the data object. In an embodiment, the set of attributes can include one or more of the following data elements associated with the respective data object: lineage, a first name, a middle name, a last name, a birthdate, a normalized phone number, a normalized e-mail address, a normalized street address, etc. In an embodiment, the data action application rules can be executed to compare a lineage associated with a data object identified in the extraction file to a lineage associated with a data object of the set of updated data objects loaded into the data store. Based on the comparison of the attributes, a confidence score is generated. In an embodiment, the confidence score represents a level of matching between a first set of attributes of a first data object of the initial set of data objects deleted from the data store (with extracted information maintained in the extraction file) and a second set of attributes of a second data object of the set of updated data objects ingested into the data store.

In an embodiment, the data action management system employs the data action application rules to determine whether to apply one or more data management actions associated with the first data object of the initial set of data objects to a second data object of the updated set of data objects. In an embodiment, the data action management system applies (or re-applies) the one or more data management action to the second data object in response to determining the corresponding confidence score (e.g., the confidence score generated based on a comparison of the attributes of the first data object and the second data object) satisfies a first condition. In an embodiment, the first condition is satisfied if the confidence score exceeds a first confidence threshold level, in accordance with the data action application rules. In an embodiment, if the comparison of the first data object and a given updated data object has a confidence score that is less than the first confidence threshold level but within a threshold range of the first confidence threshold level (e.g., within 20% of the first confidence threshold level), the data action management system can apply the corresponding data management action to the second data object in response to satisfaction of a second condition, in accordance with the data action application rules. In an embodiment, the second condition is satisfied if the first data object and the second data object share a subset of attributes that is greater than a threshold level (e.g., the two data objects have 90% of the attributes in common, the two data objects have greater than 50% of the attributes in common).

In an embodiment, the data action management system can generate a graphical user interface displaying a first set of data management actions that were applied to the updated data objects and a second set of data management actions that were not applied to the updated data objects. The interface can further display a side-by-side comparison of attributes of an initial or first data object (e.g., a first user profile that is stored prior to the data flush) and the attributes of an updated data object.

Conventional systems require highly manual-intensive activity by a human operator to identify a data object in a new or updated set of data objects to which a previously applied data management action should be applied. These conventional approaches force data stewards to perform multiple manual searches to attempt to identify which of the new data objects (ingested into the data store following a data flush operation) to apply historical data management actions.

The implementations described herein address these and other limitations of current systems by providing functionality to employ data action application rules to dynamically identify updated data objects to apply data management actions extracted and stored prior to a data flush operation. Advantages of the implementations of the disclosure over current systems include, but are not limited to: (1) efficient management of data objects (e.g., user profiles) following a data flush operation and ingestion of updated data objects; (2) avoidance of manual intervention to identify appropriate data objects for the re-application of previously executed data management actions; (3) improved data integrity and accuracy in view of changes to data object sets workflow management system operation and functionality for use with migrated workflows configured in accordance with transformation rules established and customized by a user.

As used herein, the terms "initial set of data objects" or "first set of data objects" refer generally to a set of data objects (e.g., user profiles) storing in a data store prior to a deletion operation (e.g., a data flush operation). Each data object is represented by a unique data object identifier and stores data (e.g., profile data such as first name, a last name, an e-mail address, a mailing address, etc.) and a set of attributes (e.g., a lineage associated with the data object). As used herein the terms "updated set of data objects" or "second set of data objects" refer generally to a set of data objects (e.g., unique user profiles) that are loaded or ingested into a data store following an operation (e.g., a data flush operation). A data object of the updated set of data objects can be associated with a data object identifier that is different from the data object identifier associated with the same or corresponding data object of the initial set of data objects. For example, a first data object associated with a first person (e.g., John Doe) can have an identifier that is different from an identifier associated with a second data object (of the updated set of data objects) associated with the same person (e.g., John Doe). As used herein, the term "confidence score—a score generated by the system based on a comparison of a first set of attributes of an initial data object and a second set of attributes of an updated data object. The confidence score includes score, grade, or metric representing a level of matching between the initial and updated data objects to determine whether a historical data management action associated with the initial data object is to be applied to the updated data object.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as an "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "defining," "identifying," "computing," "generating," "applying," "causing," "detecting," "performing," "analyzing," "determining," "enabling," "modifying," "transforming," "extracting," "populating," "updating," "mapping," "storing," "prioritizing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which a workflow migration management system in a computing environment including a source system and a target system. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™ (which is a trademark of Sun Microsystems, Inc.), or Perl using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

FIG. 1 shows a block diagram of an example of a computing environment 10 in which a data action management system 150 can be used in accordance with some implementations. The environment 10 includes one or more data stores 50 (herein referred to as a data store) configured to store an initial set of data objects 52 associated with an initial set of data management actions 54. In an embodiment, the initial set of data objects 52 can include multiple user profiles associated with a user of the data action management system 150. In an embodiment, the initial set of data management actions 54 represents one or more data actions that have been applied to the initial set of data objects 52 over a period of time.

In an embodiment, the data store 50 is a storage location or memory (e.g., one or more databases) configured to store the initial set of data objects 52 and the initial set of data management actions 54 at a first time (e.g., a time prior to a data flush operation). In an embodiment, at a second time, the data store 50 is configured to store an updated set of data objects 56 that are loaded following the first time (e.g., after the data flush operation).

The data action management system 150 can include one or more elements, components, or modules to perform various functions and operations, as described in detail herein. Example components include a data object extraction module 152 and a data action application manager 154. In an embodiment, the data action management system 150 is configured to interface with one or more user device 100 via a suitable graphical user interface 105 to enable control, management, and interaction by a user operating the user device 100. In an embodiment, the data action management system 150 can communicate or interact with the data store 50 and the user device(s) 100 via a suitable network. The network can include any network or combination of networks of systems or devices that communicate with one another. For example, the network 14 can be or include any one or any combination of a local area network (LAN), wide area network (WAN), telephone network, wireless network, cellular network, point-to-point network, star network, token ring network, hub network, or other appropriate configuration. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The data action management system 150 also includes a memory 158 and one or more processing devices 160 configured to execute program code (e.g., code stored in the memory 158) for implementing various functions of the data action management system 150. In some other implementations, environment 10 may not have all of these components or systems, or may have other components or systems instead of, or in addition to, those listed above.

In some implementations, the data action management system 150 can be a standalone program or application executable by one or more computer systems (e.g., one or more servers) communicatively connected to the data store 50 and one or more user systems 100. In some implementations, the data action management system 150 can be a program or application executable via a larger system configured to manage the one or more data stores 50. In some implementations, the data action management system 150 can be configured as a web service accessible by the user system 100.

According to implementations of the present disclosure, the data object extraction module 152 is configured to extract at least a portion of the initial set of data objects 52 and the initial set of data management actions 54. In an embodiment, the data object extraction module 152 extracts the information in response to a request to perform a deletion operation (e.g., a data flush operation) associated with the data store 50. In an embodiment, the data object extraction module 152 generate an extraction file 153 storing the extracted information. In an embodiment, the extracted information includes a set of attributes associated with each of the data objects of the initial set of data objects 52. The extraction file 153 stores the previously applied data management actions 54 to review for re-application to the updated set of data objects 56.

According to implementations of the present disclosure, the data action application manager 154 is configured to determine whether to apply one or more of the data actions identified in the extraction file 153 to one or more data objects of the updated set of data objects 56. The data action application manager 154 maintains data action application rules 156 that are used to govern the application of the historical data actions. In an embodiment, the data action application rules include one or more rules used to determine if a given data action is to be applied to a new or updated data object. In an embodiment, the data action application rules 156 can be configured, adjusted, updated, changed, added or deleted by a user (e.g., a data steward responsible for managing the data objects) via the user device 100. In an embodiment, the data action application manager 154 generates the applied set of data management actions 58 in association with the respective updated set of data objects 56 to which they are applied in data store 50.

The user device 100 can be implemented as any computing device(s) or other data processing apparatus or systems usable by users to access the data action management system 150. For example, the user device 100 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 100 typically executes an HTTP client, for example, a web browsing (or simply "browsing") program including a graphical user interface 105, such as a web browser based on the WebKit platform, Microsoft's Internet Explorer browser, Netscape's Navigator browser, Opera's browser, Mozilla's Firefox browser, or a WAP-enabled browser in the case of a cellular phone, personal digital assistant (PDA), or other wireless device, allowing a user of the user system 100 to access, process, and view information, pages, and applications available to it from the data action management system 150 over a network.

Each user device 100 can also typically includes one or more user input devices, such as a keyboard, a mouse, a trackball, a touch pad, a touch screen, a pen or stylus, or the like, for interacting with a GUI provided by the browser on a display (for example, a monitor screen, liquid crystal display (LCD), light-emitting diode (LED) display, etc.) of the user device 100 in conjunction with pages, forms, applications, and other information provided by the data action management system 150. For example, the user device 100 can be used to access data and applications hosted by the data action management system 150 and to perform the management of applying the data management actions to the updated set of data objects 56, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 100 may differ in their respective capacities, and the capacity of a particular user system 100 can be entirely determined by permissions (permission levels) for the current user of such user system. For example, where a salesperson is using a particular user system 100 to interact with the data action management system 150, that user system can have the capacities allotted to the salesperson. However, while an administrator is using that user system 100 to interact with the data action management system 150, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 100 and some or all of its components are operator-configurable using applications, such as a browser, including computer code executed using a central processing unit (CPU), such as an Intel Pentium® processor or the like. Similarly, the data action management system 150 and all of its components can be operator-configurable using application(s) including computer code to run using the processing device 160, which may be implemented to include a CPU, which may include an Intel Pentium® processor or the like, or multiple CPUs.

The data action management system 150 includes non-transitory computer-readable storage media (e.g., memory 158) having instructions stored thereon that are executable by or used to program a server or other computing system (or collection of such servers or computing systems) to perform some of the implementation of processes described herein. For example, the program code can include instructions for migrating workflows to intercommunicate and to process web pages, applications, and other data and media content as described herein. In some implementations, the program code can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, DVDs, CDs, microdrives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™ JavaScript, ActiveX, any other scripting language, such as VBScript, and many other programming languages as are well known.

Figure 2:
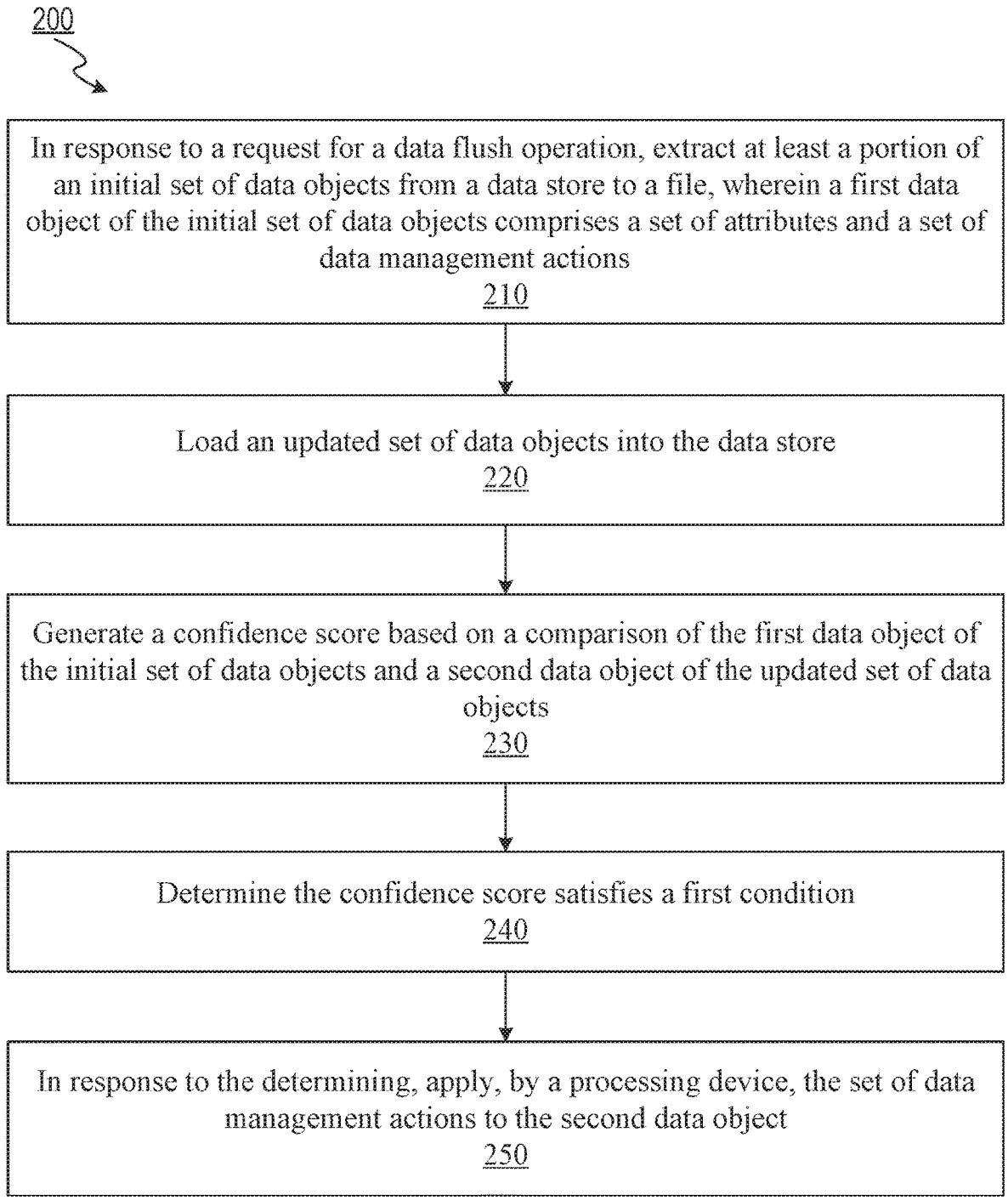
FIG. 2 is a flow diagram illustrating exemplary method for managing the application of a data management action associated with a first data object to a second data object according to some implementations.

FIG. 2 is a flow diagram illustrating exemplary method 200 for managing the application of a data management action associated with a first data object to a second data object according to some implementations. The method 200 may be performed by processing logic comprising hardware (e.g., circuitry, dedicated logic, programmable logic, microcode, etc.), software (such as instructions run on a processing device), or a combination thereof. In some implementations, the method 200 may be performed by one or more processing devices of a workflow migration system (e.g., the data action management system 150 of FIG. 1). Although the implementations of the method 200 are discussed with respect to the data action management system 150, it is to be understood that these implementations are merely exemplary, and that other devices may perform some or all of the functionality described.

Referring to FIG. 2, at block 210, in response to a request for a data flush operation, a processing device (e.g., processing device 160 of the data action management system 150) extracts at least a portion of an initial set of data objects from a data store to a file, wherein a first data object of the initial set of data objects comprises a set of attributes and a set of data management actions. In an embodiment, the set of data management actions includes one or more data management actions previously applied to the first data object.

Figure 3:
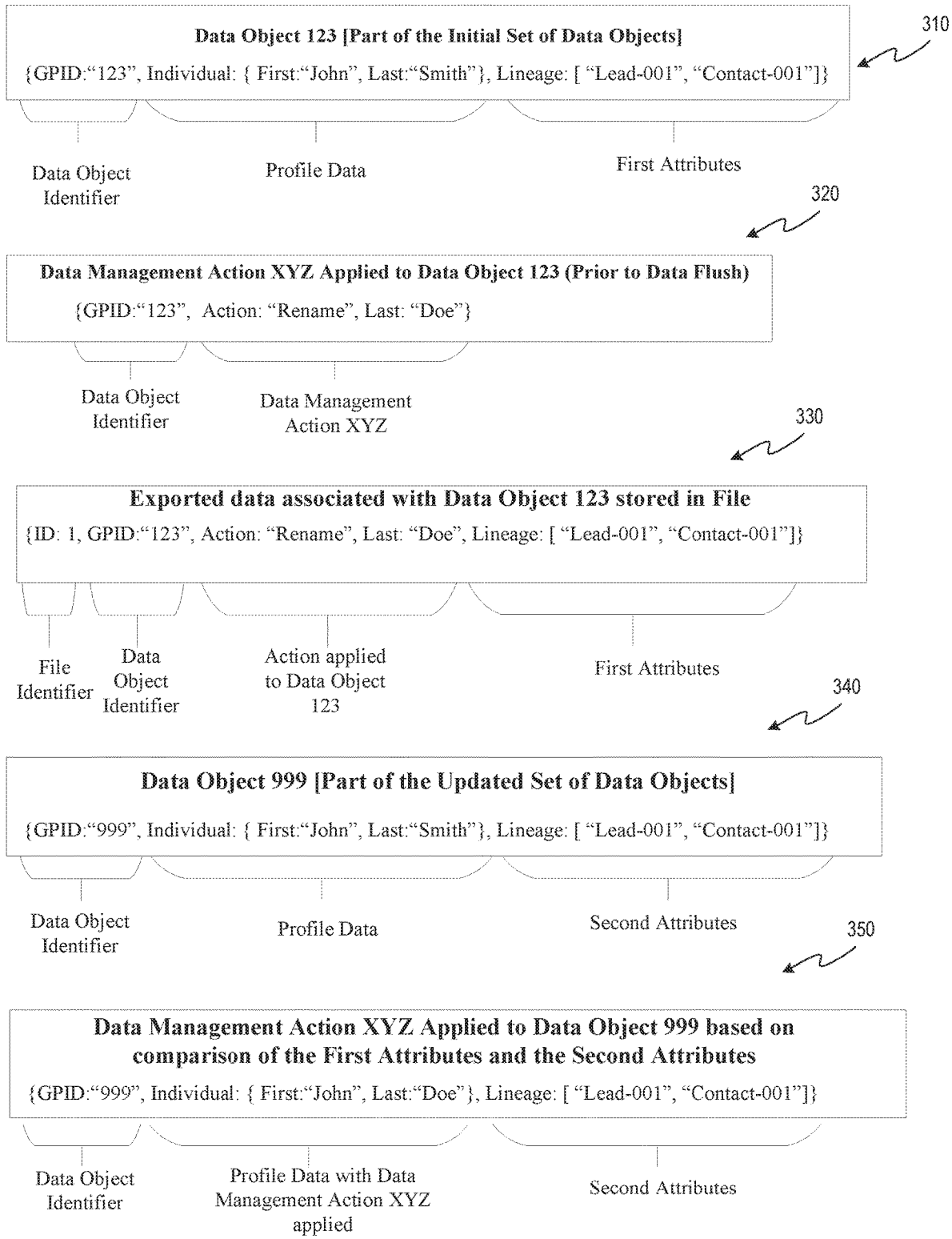
FIG. 3 illustrates example data objects and data management actions according to one or more implementations.

FIG. 3 illustrates example data objects and data management actions 300 according to embodiments of the present disclosure. A first example data object (e.g., data object 123) of the initial set of data objects is shown at 310 of FIG. 3. In an embodiment, data object 123 is the first data object described in operation 210. As shown, data object 123 includes a data object identifier (e.g., Global Profile Identifier (GPID) 123), profile date (e.g., Individual; First Name: "John"; Last Name: "Smith") and first attributes (e.g., Lineage: Lead-001; Contact-001).

In the example shown in FIG. 3, at 320, a first data management action (Data Management Action XYZ) is applied to Data Object 123. In this example, Data Management Action XYZ includes a change or rename relating to the last name of an individual associated with the data object (e.g., changing the last name associated with Data Object 123 from "Smith" to "Doe").

In an embodiment, as shown at 320, the Data Management Action XYZ to Data Object 123 occurs prior to the execution of a data flush operation. In an embodiment, with reference to FIG. 3, at 330, prior to the data flush operation, information relating to the initial set of data objects (including Data Object 123) is extracted from the data store and maintained in a file. In an embodiment, a subset of the information associated with each of the data objects can be extracted and stored in the file. For example, as shown at 330, the subset of information stored in the extraction file can include the data object identifier (GPID 123), the one or more actions applied to the data object (e.g., Action: "Rename", Last: "Doe"), and the first attributes associated with the data object (e.g., the Lineage of Data Object 123). In an embodiment, the information associated with each of the multiple data objects can be associated with a unique file identifier (e.g., File Identifier: ID: 1) which can be used to index and identify each individual portion of information associated with the respective data objects.

With reference to FIG. 2, at block 220, the processing device loads an updated set of data objects into the data store. In an embodiment, the updated set of data objects is ingested into the data store following the execution of a data flush operation wherein the initial set of data objects are deleted (e.g., Data Object 123 is deleted). In an embodiment, the updated set of data objects includes one or more data objects that have a different logical schema or format for the associated data object identifier. FIG. 3 illustrates an example data object (Data Object 999) of the updated set of data objects. As shown, the data object identifier associated with the first data object (GPID: 123) is different than the data object identifier associated with a second data object (GPID: 999) of the updated set of data objects, however the two data objects relate to the same underlying data or record.

At block 230, the processing logic generates a confidence score based on a comparison of the first data object of the initial set of data objects and a second data object of the updated set of data objects. In an embodiment, the confidence score is generated by the processing logic (e.g., executing a machine learning algorithm or suitable system) configured to compare the set of first attributes of the first data object to a set of second attributes of the second data object. For example, the lineage associated with the first data object (e.g., Lineage: Lead-001 and Contact-001 of Data Object 123 of FIG. 3) is compared to the lineage associated with the second data object (e.g., Lineage: Lead-001 and Contact-001 of Data Object 999 of FIG. 3). In an embodiment, the processing logic can compare each of the data objects of the updated set of data objects loaded into the data store with the information stored in the extraction file to identify a corresponding confidence score.

At block 240, the processing logic determines whether the confidence score satisfies a first condition. In an embodiment, the first condition is defined by the data action application rules (e.g., data action application rules 155 of FIG. 1). In an example, the first condition is satisfied if the confidence score is greater than or equal to a first threshold level. In an embodiment, the first threshold level can be any configurable level, such as 100. For example, the first condition can be satisfied if the confidence score is 100. In an embodiment, the first condition is satisfied if a confidence score of 100 generated based on a comparison of the lineage of the first data object and the lineage of the second data object (e.g., the two respective lineages are complete matches).

At block 250, in response to determining the confidence score satisfies the first condition (e.g., equals or exceeds a threshold level), the processing logic applies the set of data management actions to the second data object. In an embodiment, the processing logic can dynamically identify that the second data object of the updated set of data objects (e.g., Data Object 999 of FIG. 3) that corresponds to the first data object of the initial set of data objects (e.g., Data Object 123) and apply the corresponding data management actions (e.g., Data Management Action XYZ of FIG. 3). As shown in FIG. 3, at 350, the data management action (Data Management Action XYZ is applied to Data Object 999.

FIG. 4 illustrates example data objects managed by a data action management system during an example time period (e.g., Time=T1 to T5). At T1, the data store includes a data structure (e.g., a profile hub table) including data objects following a data load (e.g., Data Load #1). At T2, a portion of the data store includes a data action data structure (e.g., a table) including a set of data actions applied to multiple data objects (e.g., GPID 123 and GPID 456). At T3, the data action management system extracts information from the data store and generates the extraction file. As shown, the extraction file includes information associated with multiple data objects, applied data actions, and a set of attributes (e.g., lineage). In an embodiment, T3 precedes the execution of an operation resulting in the deletion of the data store (e.g., a data flush operation). In an embodiment, the extraction file is updated or generated in response to a request or indication of a data flush operation.

In an embodiment, at T4, an updated set of data objects is loaded into the data store. In an embodiment, the updated data store includes multiple data objects (e.g., GPID 999, GPID 888, and GPID 777). As shown, the data object identifiers for the updated set are different from the initial set stored in the data store at T1. In an embodiment, the data action management system reviews the data store following data load 2 to determine if one or more data actions applied to the initial set of data objects (as shown at T2) are to be applied to the data objects stored at T4.

At T5, the data action management system compares the records in the extraction file (e.g., ID: 1, ID: 2, ID: 3) to the data objects of the data store to determine corresponding confidence scores. In this example, the data action management system determines the attributes of GPID 999 (e.g., the lineage) matches the attributes of GPID 123 and applies the corresponding data action. In addition, in this example, the data action management system determines the extraction file ID #2's lineage partially matches GPID 888's lineage and GPID 777's lineage and completely matches the union of the two lineages and therefore can be applied to both data objects, even though the original data management action was previously applied to only GPID 456.

Figure 5:
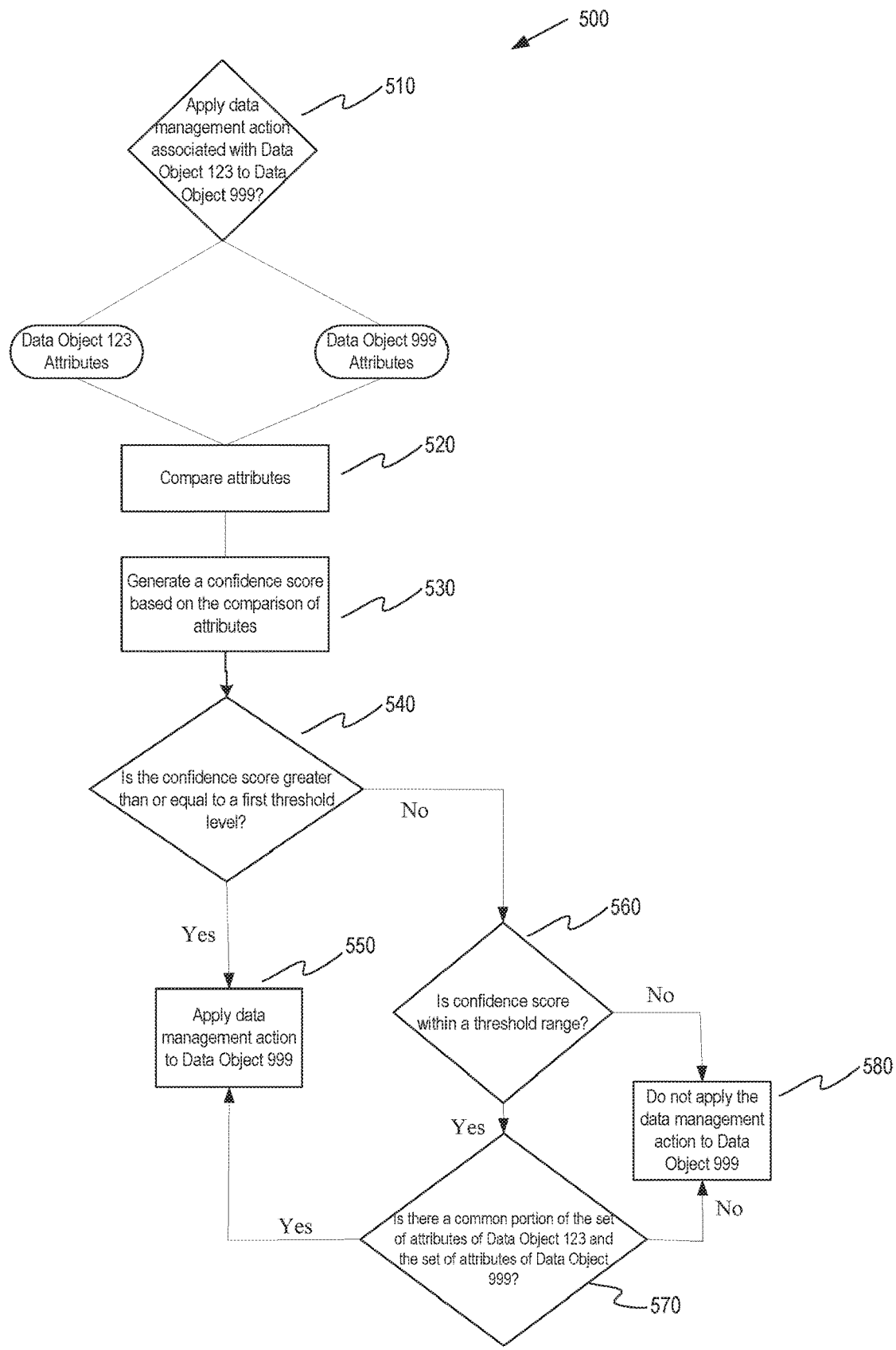
FIG. 5 is a flow diagram illustrating an exemplary method for managing the application of a data management action associated with a first data object to a second data object according to one or more implementations.

FIG. 5 is a flow diagram illustrating an exemplary method 500 for managing the application of a data management action associated with a first data object (e.g., Data Object 123) to a second data object (e.g., Data Object 999) according to some implementations. The method 500 may be performed by processing logic comprising hardware (e.g., circuitry, dedicated logic, programmable logic, microcode, etc.), software (such as instructions run on a processing device), or a combination thereof. In some implementations, the method 500 may be performed by one or more processing devices of a workflow migration system (e.g., the data action management system 150 of FIG. 1). Although the implementations of the method 500 are discussed with respect to the data action management system 150, it is to be understood that these implementations are merely exemplary, and that other devices may perform some or all of the functionality described.

Referring to FIG. 5, at block 510, processing logic initiates a data management action process to determine whether to apply a data management action associated with Data Object 123 to Data Object 999. In an embodiment, Data Object 123 is part of an initial set of data objects stored in a data store. A set of information relating to Data Object 123 has been extracted and stored in an extraction file prior to the execution of a data flush operation resulting in the deletion of Data Object 123 from the data store. In an embodiment, the set of information relating to Data Object 123 includes, at least in part, a set of attributes associated with Data Object 123 (e.g., Data Object 123 attributes). In an embodiment, the Data Object 123 attributes include, but are not limited, a lineage associated with an underlying entity relating to Data Object 123. The set of attributes can include any number or type of attributes such as a first name, a middle name, a last name, a birthdate, a normalized phone number, a normalized e-mail address, a normalized mailing address, etc.

At operation 520, the processing logic compares the Data Object 123 attributes to the Data Object 999 attributes. At operation 530, the processing logic generates a confidence score based on the comparison of the attributes. At operation 540, the processing logic determines if the confidence score is greater than or equal to a first threshold level (e.g., satisfies a first condition). If the confidence score is greater than or equal to the first threshold level, the processing logic applies the data management action previously applied to Data Object 123 to Data Object 999, at operation 550.

If the confidence score is not greater than or equal to the first threshold level, the processing logic determines if the confidence score is with a threshold range at operation 560. For example, if the generated confidence score is 93 and the first threshold level is 100, the process continues to operation 560. At operation 560, the processing logic determines whether the confidence score (e.g., 93) is within a threshold range (e.g., a confidence score range of 80 to 100).

If the confidence score is not within the threshold range, the processing logic determines that the data management action is not to be applied to Data Object 999, at operation 580. In an embodiment, at operation 580, the processing logic can further associate a flag or other indicator with the data management action and store the flagged data management action for further review or follow up by a user.

If the confidence score is within the threshold range, the process continues to operation 570 to determine if there is a common portion of the set of attributes of Data Object 123 and the set of attributes of Data Object 999. In an embodiment, the common portion includes a threshold percentage of the attributes that are the same. For example, the common portion can be identified if the multiple data objects have greater than 50% that is the same. In another example, the common portion can be identified if the multiple data objects have greater than 75% that is the same.

If the processing logic determines that there is not a common portion of the set of attributes (e.g., a common portion that is a certain percentage) then the processing logic determines that the data management action is not to be applied to Data Object 999, at operation 580.

If, at operation 570, the processing logic determines the two sets of attributes share a common portion (e.g., a same portion that is greater than 50%), the processing logic continues to operation 550 and applies the data management action to Data Object 999.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring instructions for performing such methods to computing devices. The term "article of manufacture," as used herein, is intended to encompass a computer program accessible from any computer-readable device or storage media.

The illustrative examples shown in FIGS. 3, 4, and 5 are set forth to assist in understanding the embodiments described herein and should not be construed as specifically limiting the embodiments described and claimed herein. Such variations, including the substitution of all equivalents now known or later developed, which would be within the purview of those skilled in the art, and changes thereto are to be considered to fall within the scope of the embodiments incorporated herein.

Figure 6:
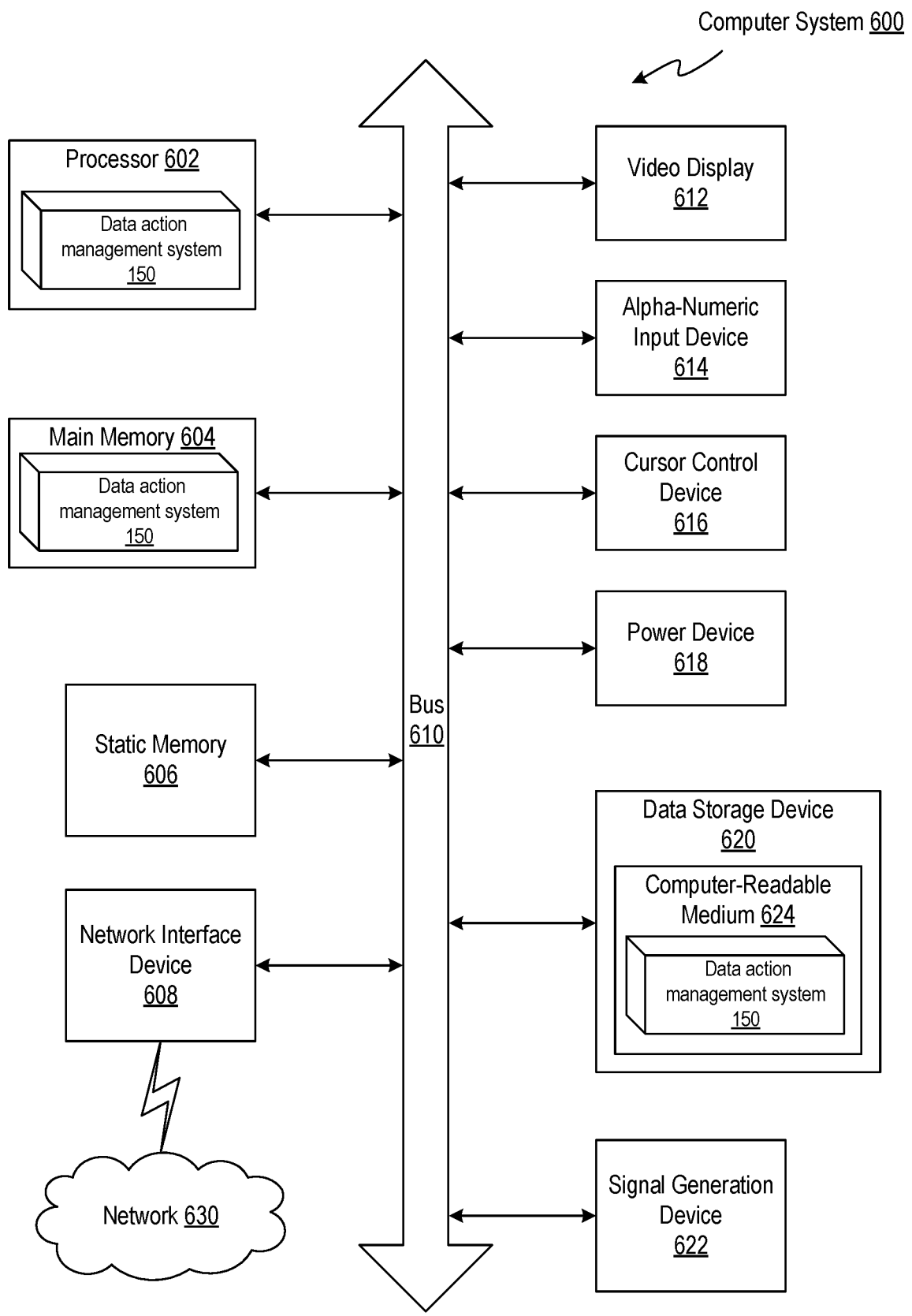
FIG. 6 illustrates a diagrammatic representation of a machine in the exemplary form of a computer system within which one or more implementations may be carried out.

FIG. 6 illustrates a diagrammatic representation of a machine in the exemplary form of a computer system 600 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 600 may be utilized by or illustrative of any of the electronic components described herein (e.g., any of the components illustrated in or described with respect to FIGS. 1-5).

The exemplary computer system 600 includes a processing device (processor) 602, a main memory 604 (e.g., ROM, flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 620, which communicate with each other via a bus 610.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions for performing the operations and steps discussed herein, such as some or all of the functionality described with respect to the data action management system 150.

The computer system 600 may further include a network interface device 608. The computer system 600 also may include a video display unit 612 (e.g., a liquid crystal display (LCD), a cathode ray tube (CRT), or a touch screen), an alphanumeric input device 614 (e.g., a keyboard), a cursor control device 616 (e.g., a mouse), and a signal generation device 622 (e.g., a speaker).

Power device 618 may monitor a power level of a battery used to power the computer system 600 or one or more of its components. The power device 618 may provide one or more interfaces to provide an indication of a power level, a time window remaining prior to shutdown of computer system 600 or one or more of its components, a power consumption rate, an indicator of whether computer system is utilizing an external power source or battery power, and other power related information. In some implementations, indications related to the power device 618 may be accessible remotely (e.g., accessible to a remote backup management module via a network connection). In some implementations, a battery utilized by the power device 618 may be an uninterruptable power supply (UPS) local to or remote from computer system 600. In such implementations, the power device 618 may provide information about a power level of the UPS.

The data storage device 620 may include a computer-readable storage medium 624 (e.g., a non-transitory computer-readable storage medium) on which is stored one or more sets of instructions (e.g., software) embodying any one or more of the methodologies or functions described herein, such as some or all of the functionality described with respect to the backup management component 310. These instructions may also reside, completely or at least partially, within the main memory 604 and/or within the processor 602 during execution thereof by the computer system 600, the main memory 604, and the processor 602 also constituting computer-readable storage media. These instructions may further be transmitted or received over a network 630 via the network interface device 608. While the computer-readable storage medium 624 is shown in an exemplary implementation to be a single medium, it is to be understood that the computer-readable storage medium 624 may include a single medium or multiple media (e.g., a centralized or distributed database, and/or associated caches and servers) that store the one or more sets of instructions.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein, but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A method comprising:

extracting, by a processing device, at least a portion of a first set of data objects from a data store to a file, wherein a first data object of the first set of data objects comprises a first set of attributes and a set of data management actions comprising a first data management action comprising a first update previously applied to first data of the first data object and a second data management action comprising a second update previously applied to second data of the first data object;

loading a second set of data objects to replace the first set of data objects in the data store;

generating a first confidence score associated with the first data management action and a second confidence score associated with the second data management action based on a comparison of the first set of attributes of the first data object of the first set of data objects and a second set of attributes of a second data object of the second set of data objects, wherein the first data object has a first identifier and the second data object has a second identifier, and wherein a first schema of the first identifier is different from a second schema of the second identifier;

in response to determining the first confidence score associated with the first data management action is greater than or equal to a threshold level, applying the first data management action comprising the first update to the second data object; and in response to determining the second confidence score associated with the second data management action is less than the threshold level, determining the second data management action is not to be applied to the second data object, wherein the second data object comprising the first update associated with the first data management action replaces the first data object in the data store.

2. The method of claim 1, further comprising:

deleting the first set of data objects from the data store.

3. The method of claim 1, wherein the first set of attributes comprises a lineage associated with an entity associated with the first data object.

4. The method of claim 1, further comprising identifying a request for a data flush operation, wherein the at least the portion of the first set of data objects is extracted in response to the data flush operation.

5. The method of claim 4, further comprising executing the data flush operation to delete the first set of data objects from the data store.

6. The method of claim 1, wherein applying the first data management action to the second data object comprises updating third data to include the first update previously applied to the first data of the first data object.

7. A system comprising:

a processing device; and a memory coupled to the processing device, the memory having instructions stored thereon that, in response to execution by the processing device, cause the processing device to:

extract at least a portion of a first set of data objects from a data store to a file, wherein a first data object of the first set of data objects comprises a first set of attributes and a set of data management actions comprising a first data management action comprising a first update previously applied to first data of the first data object and a second data management action comprising a second update previously applied to second data of the first data object;

load a second set of data objects to replace the first set of data objects in the data store;

generate a first confidence score associated with the first data management action and a second confidence score associated with the second data management action based on a comparison of the first set of attributes of the first data object of the first set of data objects and a second set of attributes of a second data object of the second set of data objects, wherein the first data object has a first identifier and the second data object has a second identifier, and wherein a first schema of the first identifier is different from a second schema of the second identifier;

in response to determining the first confidence score associated with the first data management action is greater than or equal to a threshold level, apply the first data management action comprising the first update to the second data object; and in response to determining the second confidence score associated with the second data management action is less than the threshold level, determine the second data management action is not to be applied to the second data object, wherein the second data object comprising the first update associated with the first data management action replaces the first data object in the data store.

8. The system of claim 7, the processing device to:
delete the first set of data objects from the data store.

9. The system of claim 7, wherein the first set of attributes comprises a lineage associated with an entity associated with the first data object.

10. The system of claim 7, the processing device to identify a request for a data flush operation, wherein the at least the portion of the first set of data objects is extracted in response to the data flush operation.

11. The system of claim 10, the processing device to execute the data flush operation to delete the first set of data objects from the data store.

12. The system of claim 7, the processing device to change, in the data store, third data of the second data object to include the first update previously applied to the first data of the first data object.

13. A non-transitory computer-readable storage medium having instructions encoded thereon which, when executed by a processing device, cause the processing device to:
  extract at least a portion of a first set of data objects from a data store to a file, wherein a first data object of the first set of data objects comprises a first set of attributes and a set of data management actions comprising a first data management action comprising a first update previously applied to first data of the first data object and a second data management action comprising a second update previously applied to second data of the first data object;
  load a second set of data objects to replace the first set of data objects in the data store;
  generate a first confidence score associated with the first data management action and a second confidence score associated with the second data management action based on a comparison of the first set of attributes of the first data object of the first set of data objects and a second set of attributes of a second data object of the second set of data objects, wherein the first data object has a first identifier and the second data object has a second identifier, and wherein a first schema of the first identifier is different from a second schema of the second identifier;
  in response to determining the first confidence score associated with the first data management action is greater than or equal to a threshold level, apply the first data management action comprising the first update to the second data object; and
  in response to determining the second confidence score associated with the second data management action is less than the threshold level, determine the second data management action is not to be applied to the second data object, wherein the second data object comprising the first update associated with the first data management action replaces the first data object in the data store.

14. The non-transitory computer-readable storage medium of claim 13, the processing device to delete the first set of data objects from the data store.

15. The non-transitory computer-readable storage medium of claim 13, wherein the first set of attributes comprises a lineage associated with an entity associated with the first data object.

16. The non-transitory computer-readable storage medium of claim 13, the processing device to identify a request for a data flush operation, wherein the at least the portion of the first set of data objects is extracted in response to the data flush operation.

17. The non-transitory computer-readable storage medium of claim 13, to change third data of the second data object to include the first update previously applied to the first data of the first data object.

* * * * *